United States Patent

[11] 3,573,724

| [72] | Inventor | Katsuhiro Komorida<br>Yokohama, Japan |
|---|---|---|
| [21] | Appl. No. | 652,158 |
| [22] | Filed | July 10, 1967 |
| [45] | Patented | Apr. 6, 1971 |
| [73] | Assignee | Matsushita Electric Industrial Co., Ltd.<br>Kadoma-shi, Osaka, Japan |
| [32] | Priority | July 15, 1966, Nov. 15, 1966, Dec. 2, 1966 |
| [33] | | Japan |
| [31] | | 41/46723, 41/75661 and 41/79471 |

[54] TRAFFIC FLOW DETECTING APPARATUS
5 Claims, 12 Drawing Figs.

[52] U.S. Cl........................................................ 340/38,
340/148, 340/31
[51] Int. Cl........................................................ G08g 1/09,
G08g 1/01

[50] Field of Search............................................ 340/38, 31
(selected)

[56] References Cited
UNITED STATES PATENTS
| 2,015,612 | 9/1935 | Adler | 340/31 |
| 2,419,099 | 4/1947 | Wall | 340/38 |
| 2,713,679 | 7/1955 | Ewertz | 340/38 |

*Primary Examiner*—Thomas B. Habecker
*Attorney*—Stevens, Davis, Miller and Mosher ABSTRACT: A traffic flow detecting apparatus in which a noise delivered from a running vehicle is utilized to derive an information for the signal control of an actuation-responsive traffic signal device. The traffic flow detecting apparatus is more economical and practical than the treadle type, inductance loop coil type and radar type.

Patented April 6, 1971
3,573,724
3 Sheets-Sheet 1
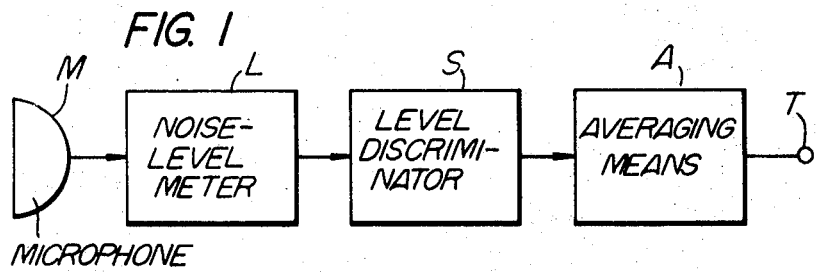
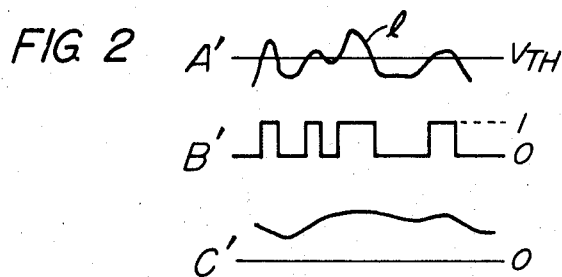
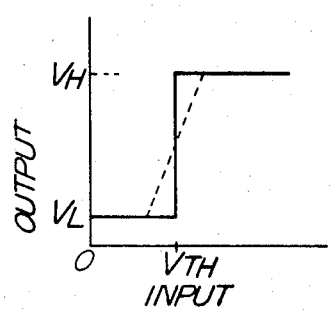
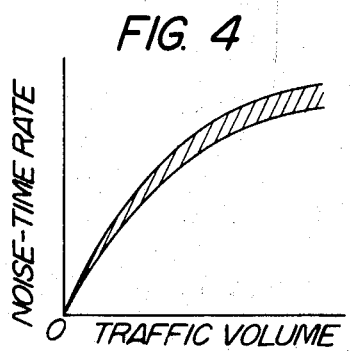
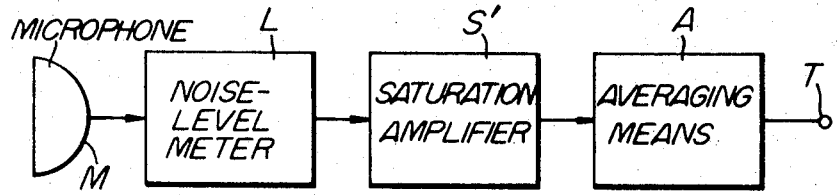
INVENTOR
KATSUHIRO KOMORIDA
BY *Stevens, Davis, Miller & Mosher*
ATTORNEYS INVENTOR
KATSUHIRO KOMORIDA
BY Stevens, Davis, Miller & Mosher
ATTORNEYS

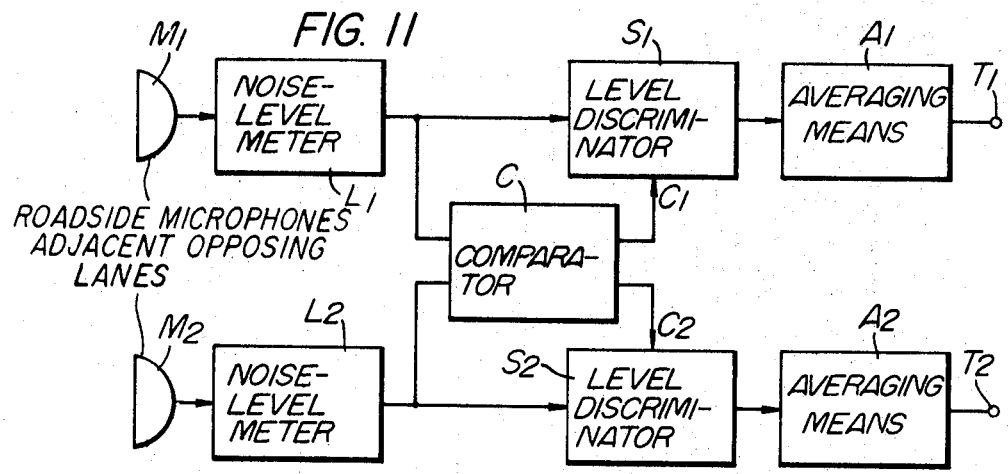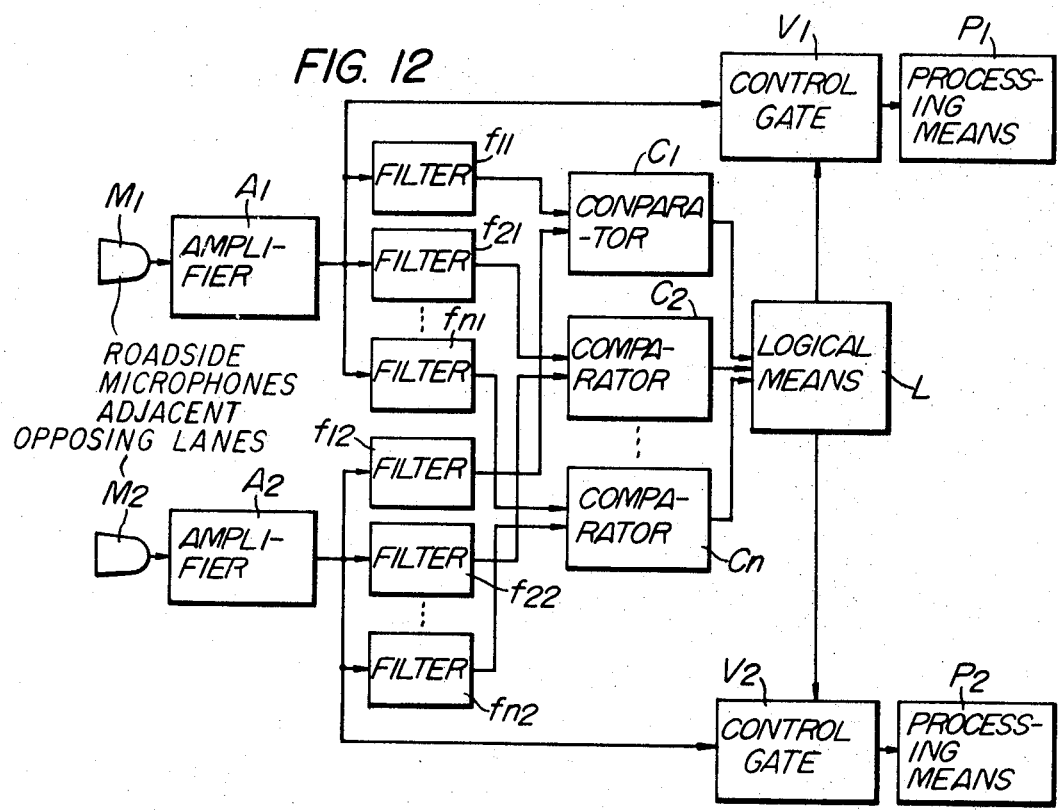

TRAFFIC FLOW DETECTING APPARATUS

This invention relates to traffic flow detecting apparatus for use in combination with the so-called actuation-responsive traffic signal device which is operative to automatically control the traffic signal in response to varying traffic demands for the purpose of relieving road traffic congestion and minimizing a dead or waste time, accidents, etc. which are the general outcome of an increase in the road traffic demand. More specifically, this invention relates to novel means for detecting the traffic flow which can be successfully employed for the above purpose for thereby economically and materially enabling to carry out the desired traffic signal control of actuation-responsive type.

Heretofore, various apparatus have been proposed for the effective detection of traffic flow, and the treadle-type of apparatus which is operative in response to treading or actuation of a rubber tube or an electrical contact structure, the inductance loop coil-type of apparatus, and the radar-type of apparatus have been typical of the prior art traffic flow detecting apparatus. However, all these prior art detecting apparatus have their respective drawbacks and can not have been extensively used in view of the fact that the first-type or treadle-type of apparatus is defective in its short service life, the first type and the second type or inductance loop coil-type of apparatus are defective in the necessity of some kind of work on the road surface in their installation, and the third type or radar-type of apparatus is defective in its high cost and radio frequency regulations. Although these prior art apparatus have been satisfactorily usable as vehicle detectors by virtue of their relatively high resolution, they have been defective in that a multiplicity of probes must be uneconomically provided in order to detect traffic flows over a plurality of lanes or to detect the overall traffic flow running into and out of an intersection.

It is therefore an object of the present invention to provide an entirely novel traffic flow detecting apparatus which is quite free from the prior defects as pointed out in the above. The present invention is based on a finding that an important information is contained in noises delivered from running vehicles, and a time rate in which a noise higher than a certain fixed level exists has an intimate interrelation with traffic flow.

FIG. 1 is a block diagram showing an embodiment of the traffic flow detecting apparatus according to the present invention.

FIG. 2 is a graphic representation of operating waveforms at various parts of the apparatus shown in FIG. 1.

FIG. 3 is a graph showing the discrimination characteristic of a level discriminator in the apparatus.

FIG. 4 is a graph showing the interrelation between the noise time rate and traffic flow.

FIG. 5 is a block diagram showing another embodiment of the present invention.

FIG. 11 is a block diagram showing another embodiment according to the present invention.

FIG. 12 is a block diagram showing a still further embodiment according to the present invention.

Figure 6:
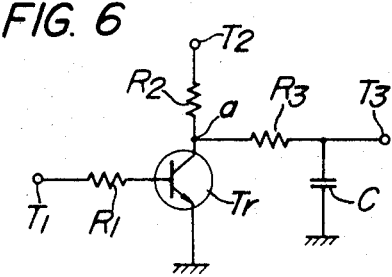
FIG. 6 is a schematic diagram of a practical circuit of part of the embodiment shown in FIG. 5.

Referring first to FIG. 1, the traffic flow detecting apparatus according to the invention includes a microphone M disposed in the vicinity of a source of noise for detecting the noise delivered from vehicles, and a noise level meter L for rectifying suitable frequency components of the detected noise for thereby establishing the noise level. Connected to the noise level meter L is a level discriminator S which has an operating characteristic as shown by a solid line in FIG. 3 so as to develop a high output voltage $V_H$ (here, $V_H=1$) or a low output voltage $V_L$ (here, $V_L=0$) depending on the magnitude of the input signal relative to a discrimination level $V_{TH}$. Connected to the level discriminator S is an averaging means A which has an averaging time of, for example, about 5 minutes and is operative in response to reception of the binary signal output from the level discriminator S to deliver a moving time average voltage of the binary signal to an output terminal T. The level discriminator S may not necessarily have the operating characteristic as shown by the solid line in FIG. 3 in which any ambiguous output voltages other than $V_H$ and $V_L$ are not developed, but may have such an operating characteristic as shown by a broken line in which the output is proportional to the input.

The operation of the traffic flow detecting apparatus having such a structure will be described with reference to FIG. 2. Suppose now that the microphone M disposed in the vicinity of a noise source receives a noise delivered from vehicles and the noise level meter L thereby delivers an output $l$ as shown in FIG. 2A'. Then, the output of the noise level meter L is applied to the level discriminator S for comparison with the discrimination level $V_{TH}$. Consequently, as shown in FIG. 2B', the output of the level discriminator S is 1 when the output $l$ of the noise level meter L exceeds the discrimination level $V_{TH}$, while the discriminator output is 0 when the output $l$ of the noise level meter L does not reach the discrimination level $V_{TH}$.

Since the output of the level discriminator S is movingly averaged while being passed through the averaging means A, the output from the averaging means A has a waveform which is substantially proportional to the degree of traffic congestion as shown in FIG. 2C'. When therefore this output is applied to a comparing and judging means which determines the magnitude of the output level, for example, the high, medium or low level of the output, a signal representing the grade of traffic congestion can be obtained. By applying this signal to an actuation-responsive traffic signal device, programmed signal control corresponding to the traffic situation can be effected. The signal in FIG. 2C' representing the time-depending noise existence rate has an interrelation with the traffic volume as shown in FIG. 4, from which it will be known that the time rate has a certain width showing a variation depending on the different noise characteristics peculiar to individual vehicles. This means that the resolution of vehicle detection becomes poor due to the dispersing nature of noise and saturation takes place due to overlap of noises as the traffic flow makes an increase. Although the signal representing the traffic flow has thus somewhat insufficient linearity, it will be understood that the curve can be sufficiently used for the purpose of determination of the relative magnitude of the traffic flow.

More precisely, the relation between the traffic flow and the noise is not fixed at all because of the fact that vehicle noises are variable depending on the kind of vehicles, running speed, acceleration and other factors. Since however the signal is treated in the averaging means A over a long averaging time of the order of 5 minutes, any variations due to the above factors are also averaged to give a stable result which is a statistical average of such variations. Further, for the same reason, any external disturbance other than vehicle noises would not adversely affect the result unless such external disturbance is of persisting nature. Generally, external disturbance provides a cause of a positive error for the traffic flow detection, but any problem would not arise therefrom since the positive error will be on the safe side even when the signal involving such error is used for traffic signal control. Further, impartation of a large noise by a large-sized vehicle can be considered as a weighting factor of the large-sized vehicle in the traffic flow.

Referring to FIG. 5 showing a block diagram of another embodiment of the invention, the traffic flow detecting apparatus includes a microphone M for detecting a noise delivered from vehicles running on a road, a noise level meter L, a saturation amplifier S', an averaging means A, and a traffic flow signal output terminal T. In FIG. 6 there is shown a practical circuit diagram of the saturation amplifier S' and the averaging means A shown in FIG. 5. The saturation amplifier S' is formed by an input resistance $R_1$, a load resistance $R_2$ and a transistor $T_r$, while the averaging means A is formed by a resistance $R_3$ and a capacitor C. $T_1$, $T_2$ and $T_3$ designate an input terminal, a power supply terminal, and an output terminal, respectively.

Figure 7:
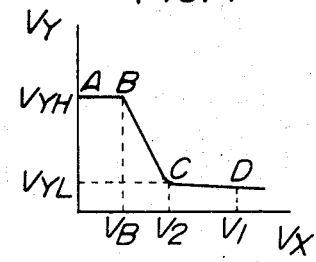
FIG. 7 is a graph showing the relation between collector voltage and input voltage for a transistor shown in FIG. 6.

FIG. 7 shows graphically the relation between the collector voltage $V_Y$ and input voltage $V_X$ for the transistor $T_r$ employed to form the saturation amplifier S'. In FIG. 7 it will be seen that the transistor $T_r$ is in its cutoff state in a range A—B due to a low value of $V_X$, the transistor $T_r$ is in its saturated state in a range C—D due to a high value of $V_X$, and the transistor $T_r$ is in its active state in a range B—C. Thus, the operating condition of the transistor $T_r$ are represented by the points B and C, and the amplifier can be freely designed to have a desired operating characteristic by suitably selecting the circuit parameters.

Figure 8:
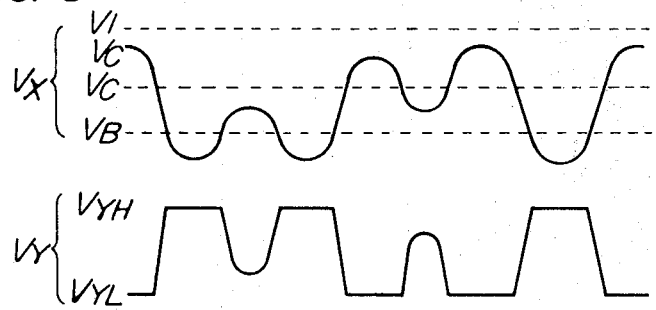
FIG. 8 is a graphic representation of the manner of variation of the collector voltage relative to the input voltage for the transistor.

The operation of the traffic flow detecting apparatus shown in FIGS. 5 and 6 will now be described. Suppose now that a suitable positive bias voltage $V_c$, at which the collector voltage $V_Y$ will take a value $V_{YL}$ in FIG. 7 in the absence of any noise, is applied together with the output $V_L$ of negative polarity from the noise level meter L as the input $V_X$ to the saturation amplifier S'. When this input $V_X$ is applied to the base of the transistor $T_r$, the collector current thereof makes a decrease and the collector voltage $V_Y$ varies relative to the input $V_X$ in a manner as shown in FIG. 8. More precisely, the collector voltage $V_Y$ takes a high voltage value $V_{YH}$ at a high noise level, takes a voltage value proportional to the noise level in case of a medium noise level, and takes the constant low voltage value $V_{YM}$ in case of a low noise level. Therefore a signal proportional to traffic flow can be obtained when a time-based means of the transiently varying collector voltage $V_Y$ is taken by the averaging means A formed by the resistance $R_3$ and the capacitor C.

From the above description it will be understood that, according to the present embodiment, the saturation amplifier determines whether a noise delivered from vehicles is above a predetermined noise level or such noise is below the predetermined noise level. Thus, the noise level is discriminated into three different quantities and their time-based mean is taken as a representation of traffic flow. Although the signal so obtained may take the form of a traffic flow information which is weighted to a certain degree by the magnitude of noise, the signal can be sufficiently satisfactorily used as an information for the traffic signal control. It will be appreciated further that the saturation amplifier for the discrimination of the noise level can have a very simplified structure since such amplifier can, for example, be simply formed by two resistors and one transistor.

The present invention as described above provides an effective means for indirectly measuring traffic flow on the basis of a noise detected by a microphone. By virtue of the above fact, the detector or microphone M may merely be disposed in close proximity to a road, and the apparatus can be more simply installed than heretofore since there is utterly no need of any work on the road, such as, the priorly required work for embedding a loop coil into the road. The present invention is further advantageous in that the probe, that is, the microphone and signal processing means may be conventional readymade articles or may be made from conventional readymade electrical parts, and hence the apparatus as a whole can be made at low cost.

Different noises are delivered from vehicles depending on the starting, running, stopped and other states of the vehicles, and therefore a noise delivered in a zone in which vehicles are normally in their running state is different from a noise delivered at an intersection at which the vehicles may make frequent stoppage and starting. Since one of the crossroads is always placed in a state to allow for free passage of vehicles therethrough, a high stopping or starting noise appears in the vicinity of the intersection at the moment of change in the traffic signal, and the noise persists in substantial proportion to the number of waiting vehicles and the number of passing vehicles. If it is supposed that the traffic flow is detected in the form of, for example, a time rate of the presence of noise magnitude over a certain fixed value or a time-based average of the number of instants of noise changes, the detected quantity represents a value which is proportional to a time-based mean of waiting or passing vehicles. Accordingly, the microphone for detecting the noise may desirably be so installed as to take in the sound in the neighborhood of the center of the intersection, and the detected noise may be led to an electronic circuit, including a level discriminator and an averaging means, which is so constructed as to effect the processing as described above. With such an arrangement, the output voltage of the electronic circuit is represented by a quantity which is substantially proportional to the time-based mean of the traffic flow. Therefore, such output voltage may be applied to a comparator for discriminating and classifying it into a plurality of gradations, and the respective gradations may be made to correspond to the adequate sets of signal indication parameters such as cycle length and split so that the signal period can be automatically switched over.

Since further vehicle procession through each crossroad at the intersection is permitted in each green signal time, a noise signal received from a single microphone may be processed in time division fashion in synchronism with the actual signal indication so that the traffic flow in each crossroad or in each phase of signal indication can be individually measured.

Figure 9:
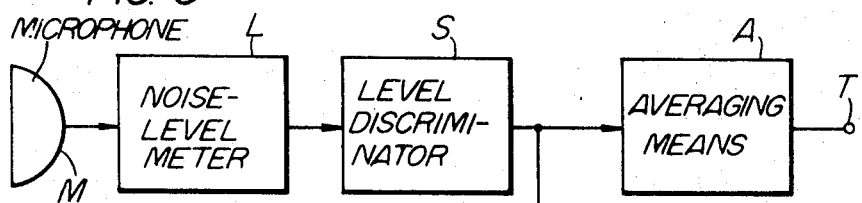
FIG. 9 is a block diagram showing still another embodiment according to the present invention.

The above manner of operation can be realized by an arrangement shown in a block diagram of FIG. 9. The traffic flow detecting apparatus shown in FIG. 9 is generally similar to the apparatus shown in FIG. 1 except that a line is branched from between a level discriminator S and an averaging means A to be connected to a changeover switch K, and averaging means $A_1$, $A_2$ and output terminals $T_1$, $T_2$ are disconnectably connected through the changeover switch K to the level discriminator S so as to obtain a phase-1 traffic flow signal and a phase-2 traffic flow signal therefrom.

This apparatus may be so arranged as to operate in a manner that the changeover switch K is switched over in synchronism with the actual signal indication, and during the period in which the changeover switch K is not connected to either averaging means $A_1$ or $A_2$, the output signals from the averaging means $A_1$ and $A_2$ are held at respective values which they have taken immediately before they are disconnected from the level discriminator S. By so arranging, the noise signal corresponding to the phase 1 received through the microphone M is averaged by the averaging means $A_1$, while the noise signal corresponding to the phase 2 also received through the microphone M is averaged by the averaging means $A_2$ so that traffic flow signals representing the respective phases appear at output terminals $T_1$ and $T_2$ and an overall mean appears at an output terminal T. Therefore by selecting the actually indicated cycle length on the basis of the output from the output terminal T which corresponds to the overall traffic flow and by comparing the outputs from the terminals $T_1$ and $T_2$ representing the traffic flows in the respective directions for thereby selecting a suitable split ratio to be allotted to a green signal time, the detecting apparatus can be applied to realize a highly efficient, and economical actuation-responsive traffic signal controller.

Figure 10:
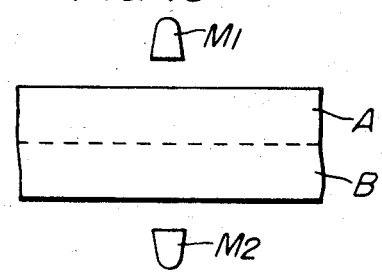
FIG. 10 is a schematic view showing preferred disposition of two microphones on opposite sides of a two-lane road.

FIG. 11 shows an embodiment which is adapted to measure both inbound and outbound traffic flows. In this embodiment, microphones $M_1$ and $M_2$ are disposed on the respective sides of inbound and outbound lanes of a road with their directional axes directed towards the road as shown in FIG. 10. Symbols $L_1$, $L_2$; $S_1$, $S_2$; and $A_1$, $A_2$ designate noise level meters, level discriminators and averaging means corresponding to L, S and A in FIG. 1, respectively. A comparator C compares the relative magnitude of noise levels $l_1$ and $l_2$ delivered from the respective noise level meters $L_1$ and $L_2$ so that a signal appears at its output terminal $C_1$ or $C_2$ depending on $l_1 > l_2$ or $l_2 > l_1$ and these signals control the respective level discriminators $S_1$ and $S_2$ to enable or disable their functions. Outputs from the averaging means $A_1$ and $A_2$ are supplied to respective output terminals $T_1$ and $T_2$.

In order to detect the traffic flows separately for the inbound and outbound directions by detecting the noise delivered from the vehicles by means of microphones, it is desirable that the probes or microphones have a highest possible directivity and are disposed in such a way that the microphone for the inbound lane detects solely the noise delivered from inbound vehicles, while the microphone for the outbound lane detects solely the noise delivered from outbound vehicles. However, in view of the fact that microphones generally do not have a sufficiently sharp directivity and sound makes a wide spread in the space, the probe structure and the manner of probe disposition cannot singly attain the separative detection of the inbound traffic flow and the outbound traffic flow. To attain the above purpose, the comparator C is employed to compare the relative magnitude of noise levels $l_1$ and $l_2$ delivered from the respective noise level meters $L_1$ and $L_2$, and a larger output signal is transmitted to the associated processing means as a detected output representing a vehicle or vehicles advancing in that direction, while an output signal on the opposite side is suitably attenuated or cut off.

In case the noise levels $l_1$ and $l_2$ applied to the comparator C are equal to each other, this means that the microphones $M_1$ and $M_2$ have their respective noise sources. Since the above situation is brought forth from a case in which a noise source or a vehicle is substantially equally spaced from the microphones $M_1$ and $M_2$, that is, the vehicle passes in the vicinity of the centerline, or a case in which individual vehicles pass through the inbound and outbound lanes at the same time, the level discriminators $S_1$ and $S_2$ may both be placed in operation and the outputs of the noise level meters $L_1$ and $L_2$ may be unobstructedly led into the averaging means $A_1$ and $A_2$ as detected outputs for inbound and outbound vehicles. In this manner, a signal from a noise source passing through the opposite lane can be eliminated and a detected output solely representing the noise from the inbound or outbound vehicle can be led to either output terminal $T_1$ or $T_2$, and the desired purpose can thus be attained. The inventive apparatus, therefore, can also be utilized as a traffic flow detector for an offset computing apparatus in a cooperative traffic signal system.

The above arrangement may however be insufficient in that, when two vehicles simultaneously pass through the inbound and outbound lanes, the apparatus may give an erroneous determination that only one vehicle passes through that lane which delivers a higher noise.

An embodiment shown in FIG. 12 is proposed to deal with such a situation, and is arranged to determine the number of noise sources, either single or not, by giving particular attention to frequency components of noise. The traffic flow detecting apparatus shown in FIG. 12 comprises microphones $M_1$ and $M_2$ corresponding to the microphones $M_1$ and $M_2$ in FIG. 11, amplifiers $A_1$ and $A_2$ for amplifying the respective outputs of the microphones $M_1$ and $M_2$, filters $f_{11}$—$f_{nl}$ for dividing the output of the amplifier $A_1$ into its frequency components, and filters $f_{12}$—$f_{n2}$ similar to the filters $f_{11}$—$f_{nl}$ for dividing the output of the amplifier $A_2$ into its frequency components. The apparatus further comprises comparators Ci ($i=1, 2, ----, n$) for determining the relative magnitude of output signals from the filters $f_{i1}$ and $f_{i2}$, a logical means L for receiving the outputs of the comparators $C_1$—$C_n$, control valves (gate means) $V_1$ and $V_2$ adapted to be controlled by the output from the logical means L for thereby allowing passage therethrough of the output signals from the respective amplifiers $A_1$ and $A_2$ or suitably attenuating such output signals, and processing means $P_1$ and $P_2$ for converting the noise signals into the desired form such as the noise time rate described above.

The operation of the apparatus shown in FIG. 12 will be described hereunder. Suppose that noise signals are detected by the microphones $M_1$ and $M_2$ and the comparators $C_1$—$C_n$ give substantially same determination. Since the above situation represents the fact that the two microphones detect noises having the same frequency components but having different magnitudes and thus the received noise is from the single noise source, the logical means L is operative in response to the determination by the comparator $C_i$ to control either the control valve (gate means) $V_1$ or $V_2$ so that a larger output signal is transmitted to the associated processing means as a detected output for the vehicle advancing in that direction and an output signal on the opposite side is suitably attenuated or cut off. If the determination given by the comparators $C_1$—$C_n$ is approximately half-to-half, this means that the microphones sense noise sources having different frequency components. Since the above situation may result from a case in which a single noise source is passing in substantially equally-spaced relation from the microphones $M_1$ and $M_2$, that is, a vehicle passes in the vicinity of the centerline, or a case in which individual vehicles simultaneously pass through the inbound and outbound lanes, the logical means L is operative to open both the control valves (gate means) $V_1$ and $V_2$ so that the outputs of the amplifiers $A_1$ and $A_2$ are unobstructedly led to the respective processing means $P_1$ and $P_2$ as detected outputs for the inbound and outbound vehicles. Thus, the detected output led to the processing means $P_1$ or $P_2$ is free from the signal from the noise source passing through the opposite lane and represents solely the noise from the inbound or outbound vehicles, and the desired purpose can be fully attained.

Suppose a simplest form of the apparatus, that is, $n=1$ in the apparatus shown in FIG. 12. Then, the comparator C may be such that it can sufficiently determine one of three stages, that is, input 1 > input 2, input 1 ≈ input 2, and input 1 < input 2. Also, the logical means L associated with the comparator C may be operative to control the control valves (gate means) $V_1$ and $V_2$ in a manner that $V_1$ is open and $V_2$ is shut off in case of input 1 > input 2, $V_1$ and $V_2$ are both open in case of input ≈ input 2, and $V_1$ is shut off and $V_2$ is open in case of input 1 < input 2. By so arranging, an effect quite analogous to the case of $n \geq 2$ can be easily attained.

From the foregoing description, it will be understood that, in the traffic flow detecting apparatus according to the present invention, a microphone is used to detect a noise delivered from vehicles for the detection of traffic flow, the noise level thus derived is compared with a reference level, and then a time-based mean of the comparison output is taken to obtain the signal representative of the amount of the traffic flow. It will be appreciated that the apparatus of the present invention having such a feature can be easily installed and facilitate traffic flow detection in an economical and practically versatile fashion.

I claim:

1. An average traffic flow detecting apparatus comprising, in combination, noise detector means placed adjacent a road, noise level meter means connected to said noise detector means, a level discriminator means for comparing an output level of said noise level meter means with a reference level, and averaging means connected to the output of said level discriminator means for providing a signal representing an average traffic by determining a time-based mean value of the output of said level discriminator means.

2. An average traffic flow detecting apparatus as defined in claim 1, wherein said level discriminator means includes means for comparing an input thereof with a reference level and quantizing the same into two values.

3. An average traffic flow detecting apparatus as defined in claim 1, wherein said level discriminator means is a saturation amplifier.

4. A traffic flow detecting apparatus comprising, in combination, a pair of noise detectors placed at roadsides adjacent mutually opposed traffic lanes, a comparator means for mutually comparing the outputs of said pair of noise detectors, a level discriminator means connected to each of said noise detectors and to said comparator means for discriminating an output level of said detector with a reference level, said discriminator means being controlled according to the output of said comparator means, and an averaging means connected to each of said level discriminator means for providing a time-based mean of the output of said discriminator means, so that the informations of the inbound and outbound traffic flows are separately obtained.

5. A traffic flow detecting apparatus comprising, in combination a pair of noise detectors placed at roadsides adjacent mutually opposed traffic lanes, a plurality of filter means connected to the output of each noise detector for dividing the output into the same number of frequency ranges, comparator means connected to said filter means for mutually comparing corresponding frequency components of the outputs of said pair of noise detectors, gate means connected to each noise detector and said comparators for controlling the transmission of the output signal of said noise detector according to the output of said comparators, and an averaging means connected to each of said level discriminator means for providing a time-based mean of the output of said discriminator mean, so that the informations of the inbound and outbound traffic flows are separately obtained.